US008447613B2

(12) United States Patent

Hussey et al.

(10) Patent No.: US 8,447,613 B2

(45) Date of Patent: May 21, 2013

(54) ROBOT AND SERVER WITH OPTIMIZED MESSAGE DECODING

(75) Inventors: Patrick Alan Hussey, Hollis, NH (US); Maryellen Abreu, Andover, MA (US)

(73) Assignee: iRobot Corporation, Bedford, MA (US)

( * ) Notice: Subject to any disclaimer, the term of this patent is extended or adjusted under 35 U.S.C. 154(b) by 952 days.

(21) Appl. No.: 12/431,733

(22) Filed: Apr. 28, 2009

(65) Prior Publication Data

US 2009/0276218 A1 Nov. 5, 2009

Related U.S. Application Data

(60) Provisional application No. 61/048,495, filed on Apr. 28, 2008.

(51) Int. Cl.

| | |
|---|---|
| ***G10L 21/00*** | (2006.01) |
| ***G10L 19/00*** | (2006.01) |
| ***G10L 15/00*** | (2006.01) |
| ***G10L 13/00*** | (2006.01) |
| ***H04M 1/64*** | (2006.01) |
| ***H04M 11/00*** | (2006.01) |

(52) U.S. Cl.

USPC ........ 704/270.1; 704/201; 704/231; 704/258; 704/275; 379/88.01; 379/88.06; 379/88.18

(58) Field of Classification Search

None

See application file for complete search history.

(56) References Cited

U.S. PATENT DOCUMENTS

| | | | | |
|---|---|---|---|---|
| 4,967,337 | A * | 10/1990 | English et al. | 700/79 |
| 6,279,125 | B1 * | 8/2001 | Klein | 714/38.13 |
| 7,062,428 | B2 * | 6/2006 | Hogenhout et al. | 704/9 |
| 7,760,857 | B2 * | 7/2010 | Vetter et al. | 379/9.03 |
| 7,765,102 | B2 * | 7/2010 | Mowatt et al. | 704/257 |
| 7,865,363 | B2 * | 1/2011 | Rao | 704/251 |
| 2007/0088553 | A1 * | 4/2007 | Johnson | 704/257 |
| 2007/0140440 | A1 * | 6/2007 | Dunsmuir | 379/80 |

OTHER PUBLICATIONS

Peterson, W.W.; Brown, D.T.; , "Cyclic Codes for Error Detection," Proceedings of the IRE , vol. 49, No. 1, pp. 228-235, Jan. 1961.*

Juola, P.; , "Whole-word phonetic distances and the PGPfone alphabet," Spoken Language, 1996. ICSLP 96. Proceedings., Fourth International Conference on , vol. 1, No., pp. 98-101 vol. 1, Oct. 3-6, 1996.*

Prassler et al., "A Short History of Cleaning Robots," Autonomous Robots, vol. 9, pp. 211-226 (2000).

King, Ian. "It's Dyson the windbag." *The Sun*, Feb. 23, 2005, webpage copyrighted 2008, Retrieved from the Internet: http://www.thesun.co.uk/sol/homepage/news/article103338.ece?print=yes, accessed online Apr. 16, 2009, 2 pp.

Marks, Paul. "Clever motor leads to talking vacuum cleaners." *NewScientist*, Oct. 5, 2003, Retrieved from the Internet: http://www.newscientist.com/article/dn4234-clever-motor-leads-to-talking-vacuum-cleaners.html, accessed online Apr. 16, 2009, 2 pp.

* cited by examiner

*Primary Examiner* — Brian Albertalli

(74) *Attorney, Agent, or Firm* — Honigman Miller Schwartz and Cohn LLP

(57) ABSTRACT

A method for optimizing message transmission and decoding comprises: reading data from a memory of an originating device, the data comprising information regarding the originating device; encoding the data by converting the data to a subset of words having a ranked recognition accuracy higher than the remainder of words; transmitting the encoded data from the originating device to a receiving system audibly as words via a telephone connection; utilizing a voice recognition software to recognize the words; decoding the words back to the data; and taking a predetermined action based on the data.

18 Claims, 1 Drawing Sheet

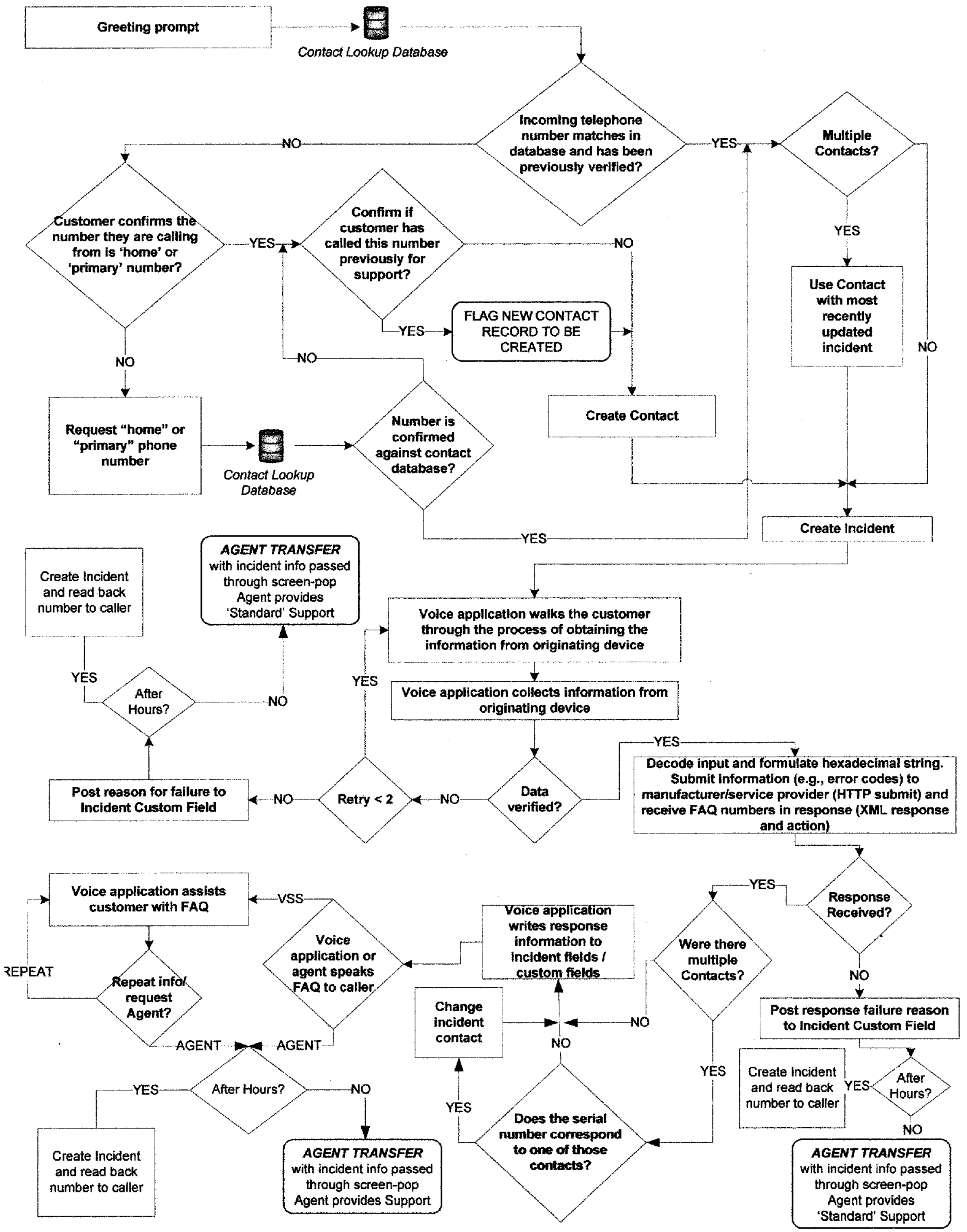
Greeting prompt
Contact Lookup Database
Incoming telephone number matches in database and has been previously verified?
NO
YES
Multiple Contacts?
Customer confirms the number they are calling from is 'home' or 'primary' number?
YES
Confirm if customer has called this number previously for support?
NO
YES
FLAG NEW CONTACT RECORD TO BE CREATED
Use Contact with most recently updated incident
NO
NO
NO
Request "home" or "primary" phone number
Contact Lookup Database
Number is confirmed against contact database?
Create Contact
YES
Create Incident
Create Incident and read back number to caller
AGENT TRANSFER with incident info passed through screen-pop Agent provides 'Standard' Support
Voice application walks the customer through the process of obtaining the information from originating device
YES
After Hours?
NO
YES
Voice application collects information from originating device
YES
Decode input and formulate hexadecimal string. Submit information (e.g., error codes) to manufacturer/service provider (HTTP submit) and receive FAQ numbers in response (XML response and action)
Post reason for failure to Incident Custom Field
NO
Retry < 2
NO
Data verified?
Voice application assists customer with FAQ
VSS
YES
Response Received?
REPEAT
Repeat info/ request Agent?
Voice application or agent speaks FAQ to caller
Voice application writes response information to Incident fields / custom fields
Were there multiple Contacts?
NO
Post response failure reason to Incident Custom Field
Change incident contact
NO
NO
AGENT
AGENT
YES
Create Incident and read back number to caller
YES
After Hours?
After Hours?
NO
YES
YES
NO
Create Incident and read back number to caller
AGENT TRANSFER with incident info passed through screen-pop Agent provides Support
Does the serial number correspond to one of those contacts?
AGENT TRANSFER with incident info passed through screen-pop Agent provides 'Standard' Support

ROBOT AND SERVER WITH OPTIMIZED MESSAGE DECODING

INTRODUCTION

The present teachings relate to a system and method for reporting consumer appliance and/or electronic device information, including error, telemetry, usage, and other data over a communication line to a receiving system. Certain embodiments of the present teachings relate more specifically to improving customer service by facilitating more reliable and efficient transmission of information regarding a consumer appliance or electronic device via a telephone interface to a remote/central customer relationship management database.

BACKGROUND

It has been proposed to provide devices such as vacuum cleaners that can transmit information useful in the context of customer service troubleshooting calls. Such information includes the history of the appliance's motor, its model, when it was built, and temperature conditions it has been used in. Proposed implementations have utilized dial-tone multi-frequency (DTMF) signaling over analog telephone lines in the voice frequency band between telephone handsets and a switching center. Such implementations proved undesirable because, among other things, they did not have suitable recognition confidence to meet their goals. Customer service experience was not improved.

SUMMARY

The present teachings provide a consumer appliance or electronic device comprising: a memory; a processor connected to the memory; a speaker connected to the processor for playing audible sounds; stored in the memory, a set of prerecorded human voice messages including a plurality of sentences and individual words; a mapping stored in memory and comprising a subset of individual words of the prerecorded human voice messages having a ranked recognition accuracy higher than the remainder of the individual words mapped to a set of code characters; and an operation routine wherein the processor plays selected ones of the subset of individual words of the prerecorded human voice messages, the selected ones being selected, according to the mapping, to correspond to a diagnostic, customer service, or other code sequence made up of selected ones of the code characters.

Although exemplified herein as a robotic cleaning device, the present teachings contemplate using the methods and systems described herein for a variety of consumer appliance or electronic devices (also referred to herein as "Originating devices"), such as vacuums, ovens, dishwashers, washers, dryers, computers, televisions, DVD players, and even larger-scale devices such as air conditioners, water treatment systems, lawn mowers, tractors, and automobiles. Indeed, the present teachings contemplate utilizing the methods and systems described herein for any device having a processor and capable of storing information such as identification information, error codes, and/or other information regarding its operation.

The present teachings also provide a customer service server comprising: a memory; a processor connected to the memory; a telephone interface connected to the processor; a voice recognition software facility; a mapping stored in memory and comprising a subset of individual words of a prerecorded human voice message stored as a plurality of sentences and individual words in a predetermined, known consumer appliance mapped to a set of code characters; a routine executed by the processor in which members of the subset of prerecorded human voice messages, received over the telephone interface and having originated as audible sounds output by a consumer appliance, are sent to the voice recognition software facility; and the recognized words returned from the voice recognition software facility are converted and decoded into a character sequence; and a routine executed by the processor in which the character sequence is interpreted, and a customer service action available in a customer service database is initiated based on the interpreted character sequence.

Further, the present teachings provide a method for optimizing message transmission and decoding comprising: reading data from a memory of an originating device, the data comprising information regarding the originating device; encoding the data by converting the data to a subset of words having a ranked recognition accuracy higher than the remainder of words; transmitting the encoded data from the originating device to a receiving system audibly as words via a telephone connection; utilizing a voice recognition software to recognize the words; decoding the words back to the data; and taking a predetermined action based on the data.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying FIGURE, which is incorporated in and constitute a part of this specification, illustrates an embodiment of the present teachings and together with the description, serves to explain the principles of the present teachings.

BRIEF DESCRIPTION OF THE DRAWINGS

FIG. 1 is a flow chart illustrating an exemplary embodiment of a process performed by a receiving system in accordance with the present teachings.

DESCRIPTION OF THE PRESENT TEACHINGS

Reference will now be made in detail to exemplary embodiments of the present teachings, an example of which is illustrated in the accompanying FIGURE.

In an exemplary implementation, the present teachings provide reporting of originating device information, including error, telemetry, usage, and other onboard data from an end user customer over a communication line such as a plain old telephone service (POTS) to a receiving system such as a remote/central customer relationship management (CRM) database. Such an implementation uses the originating device to speak the data in an encoded form to enhance/improve the customer service experience, transmit desired and/or required information without involving the human variable and human error, transmit the data as quickly as feasible, eliminate errors in customer service representative (CSR) troubleshooting, reduce in warranty exchange (IWE) costs, reduce customer service costs, and reduce many other service/warranty-related costs.

Such an implementation can utilize existing non-synthesized (recorded in memory) voice demo technology in an originating device having suitable computing power for example an iRobot® Roomba® 500 series robot (e.g., as substantially disclosed in U.S. patent application Ser. Nos. 11/633,869; 11/633,886, 11/633,885; and 11/633,883, herein incorporated by reference in their entirety).

The originating device can comprise a memory (or "black box"), a processor connected to the memory, and a speaker connected to the processor for playing audible sounds, such as those used to transmit information from the originating device to a receiving system such as a customer service server. Prerecorded human or synthesized voice messages, such as single words, can be stored in the memory. The memory can also store a mapping of a subset of individual words of the prerecorded human or synthesized voice messages having a ranked recognition accuracy higher than the remainder of the individual words to a set of code characters. The code characters can include, for example, hexadecimal characters. A first operation routine can execute in response to a first command so that the processor plays selected prerecorded human voice messages over the speaker as audible sounds, for example as part of a demonstration, a user interface, or an instructional script. A second operation routine can execute in response to a second command so that the processor plays selected ones of the subset of individual words of the prerecorded human or synthesized voice messages, the selected ones being selected, according to the mapping, to correspond to a diagnostic, customer service, or other code sequence made up of selected ones of the code characters.

A receiving system, for receiving the selected ones of the subset of individual words, can include a customer service server comprising a memory, a processor connected to the memory, a telephone interface connected to the processor either indirectly or directly, and a voice recognition software facility. The memory can include a mapping of a subset of individual words of a prerecorded human or synthesized voice message stored as a plurality of sentences and individual words in a predetermined, known consumer appliance to a set of code characters, such as a full set of hexadecimal characters. The customer service server can also comprise a routine executed by the processor in which members of the subset of prerecorded human voice messages, received over the telephone interface, and having originated as audible sounds output by the consumer appliance or electronic device, are sent to the voice recognition software facility. The recognized words returned from the voice recognition software facility are converted and decoded into a character sequence. Another routine executed by the processor can interpret the character sequence and initiate a customer service action based on the interpreted character sequence. The customer service action can comprise, for example, initiating sending of a replacement part or providing directions to a web page detailing servicing instructions.

Various embodiments of the present teachings utilize a voice application that can comprise a voice recognition system such as interactive voice response (IVR) to record data from an originating device such as, for example, an autonomous cleaning robot. The system and method of the present teachings can result in the ability to transmit and record hexadecimal characters with near 100 percent recognition confidence, whereas typical voice recognition software has about 30-50% confidence. Interactive voice response is an interactive technology that allows a computer to detect voice and keypad inputs. Hexadecimal is a numeral system that uses sixteen distinct symbols, most often the symbols 0-9 to represent values zero to nine, and A, B, C, D, E, F to represent values ten to fifteen.

The present teachings utilize a voice application to reliably and robustly transmit runtime and error information, also referred to as black box (BBK) data, because most of the keys (data mapping from error to hexadecimal character) would only use one hexadecimal character as they are only two-digit decimals. Exemplary black box data of interest can include, but is not limited to: originating device BLID or serial number that can be, for example, sixteen hexadecimal characters in length; software date tag/version that can be, for example, 0-4 bits for the day of the month, 5-8 bits for the month, and 9-11 bits for the year (using, for example, "07" for 2007); runtime hours (e.g., for determining warranty information); mission runtime; and up to 20 error codes at 4 bits a piece or 80 bits of other information. Other information that may be collected and transmitted can include number of recondition charges, 0-1 indicating whether a stasis sensor is functional, a checksum for data integrity, model number, warranty information, and information regarding the environment in which the originating device is being used. A table depicting exemplary variables reported by the originating device is depicted below.

| Data | Length (nibbles) | Format | Use/Meaning | Example | Translation |
|---|---|---|---|---|---|
| BLID | 16 | 16 hex characters to lookup serial (64 bit BLID), most significant first | Collecting the serial number via BLID | 4719 5C62 BOB5 4FFF | KYN570010708160000975 |
| SW version | 3 | bits 0-4: day of the month (1-31) bits 5-8: month (1-12) bits 9-11: year (0-7, where year 0 is 2007) | Getting the current SW image version (year-month-day) | E29 | 2008-05-28 |
| Runtime Hours | 4 | 0-65535 (8760 hours for one year) | Warranty information | 00 7D | 125 |
| Mission Hours | 3 | 0-4095 | Usage models | 00 1 | 1 |
| last-pause-id-0 | 1 | 0-14 | Last error code | A | 10 |
| last-pause-id-1 | 1 | 0-14 | Second to last error code | 2 | 2 |
| last-pause-id-2 | 1 | 0-14 | Third to last error code | 5 | 5 |
| last-pause-id-3 | 1 | 0-14 | Fourth to last error code | 9 | 9 |
| last-charge-abort | 1 | 0-11 | Last charging error or charging safety termination | 0 | 0 |
| n-ddb-rgens | 1 | 0-15 | number of recondition charges | 2 | 2 |

-continued

| Data | Length (nibbles) | Format | Use/Meaning | Example | Translation |
|---|---|---|---|---|---|
| stasis-disable | 1 | 0-1 | 1 if robot considers stasis sensor nonfunctional; 0 otherwise | 1 | 1 |
| CRC | 4 | 0-65535 | Checksum for data integrity | FFFF | CRC (not actual CRC) |
| Total | 37 | | | | |

In accordance with certain embodiments, the data to be transmitted in accordance with the present teachings is stored in the originating device memory as hexadecimal characters. However, the present teachings also contemplate storage of the data in other formats and conversion of that data to hexadecimal characters prior to conversion into words for transmission.

In accordance with various embodiments of the present teachings an application program interface (API) can transmit commands to the originating device to "speak" the data, and it can then take about 30 seconds for the originating device to gather, encode, and transmit the hexadecimal characters. All information needed for customer service can be spoken by the originating device.

Certain information can be used for purposes other than trouble shooting, for example setting intelligent priorities for engineering by storing analyzable data pertaining to how originating devices are being used and a more accurate tracking of the problems they experience.

A processor on the originating device can retrieve data from memory and encode the data for optimized recognition by a receiving system by mapping the data to spoken words as described in more detail in the exemplary embodiments set forth below. The receiving system, which includes a voice application for which the transmitted data can be encoded for optimal recognition, can convert the data back to a usable form after transmission of the encoded data over a communication line.

The present teachings contemplate the originating device providing identification information as well as troubleshooting information (e.g., error codes) via the communication line. Thus, the consumer will not have to find and provide a customer service representative with originating device identification and troubleshooting information in response to multiple, time consuming questions. This may greatly improve a consumer's customer service experience. The information (data) communicated by the originating device can be entered into a decision tree (e.g., a diagnostic decision tree) of the receiving system. The decision tree can, for example, direct the consumer to an appropriate script or message, for example to diagnosis and repair information. If additional information is needed for diagnosis, the consumer can be routed to a customer service agent or to automated additional troubleshooting information. The receiving system can, alternatively or additionally, generate a request for a replacement part to be sent to the customer if needed. In accordance with certain embodiments, the decision tree can be tailored in accordance with a particular appliance/device and/or in accordance with a particular manufacturer/service provider's specifications, as would be readily understood by those skilled in the art.

In certain embodiments, such as the illustrated embodiment above, the BLID received by the receiving system can be a manufacturer's serial number, which sent to a lookup table to determine another serial number or other identification number that is used by another entity such as, for example, the service provider.

In an exemplary scenario utilizing a system in accordance with the present teachings, a caller utilizes a communication device to establish a communication link with a receiving system comprising a voice application. For example, a telephone establishes a communication link via a POTS in a well known manner. The voice application can then ask the consumer to place the communication device (e.g., the phone) near the originating device and press a predetermined combination of buttons on the originating device that can cause the originating device to emit data such as identification and troubleshooting data. In certain exemplary embodiments of the present teachings the caller switches the originating device "ON," keeps the device nearby (e.g., generally within reach of the telephone), and calls a designated customer service number. The telephone can then be placed at or near a designated spot on the originating device, for example adjacent a left side of the device. Another button (e.g., the SPOT button on an iRobot® Roomba®) can then be pressed until the device begins to "speak" (i.e., transmit data into the telephone). The receiving system can record, convert, and attach the data to a "ticket" or "incident" and route the caller to an appropriate corrective action. When the receiving system has received a complete data set, it can so-inform the caller by, for example, playing an indicative sentence such as "Okay, I've got it." The caller can then listen to additional information and/or terminate the telephone connection.

FIG. 1 is a flow chart illustrating an exemplary embodiment of a customer service call in accordance with the present teachings. As shown, when a user calls a designated number, a greeting prompt is played and the receiving system accesses a contact database to identify the caller, for example based on the caller's telephone number. If the caller's telephone number matches a contact telephone number in the database, the system determines whether multiple contacts have been found for the caller's telephone number. If multiple contacts exist, the system can select the contact information associated with the caller's telephone number that corresponds with the most recently updated incident. The system can then create an "incident" associated with the contact information. An incident can include, for example, a previous customer service call. If multiple contacts do not exist (i.e., there is a single, previously-verified contact associated with the caller's telephone number), the system creates an "incident" associated with the contact information.

If the caller's telephone number does not match a contact telephone number in the database, the receiving system can confirm that the caller is calling from their "home" or "primary" telephone number. If the caller is calling from their home or primary telephone number, the system can create a contact associated with the caller's telephone number. To create a contact, the system may ask the caller to input certain information, such as a name and home address. Thereafter, the system can create an incident associated with the newly-created contact information. If the caller is not calling from their home or primary telephone number, the system can ask the caller to enter (e.g., via speaking or via key pad entry) their home or primary telephone number. That number can then be used to look up contact information in the database. If contact information is found, the system determines whether multiple contacts have been found for the caller's telephone number. If multiple contacts exist, the system can select the contact information associated with the caller's telephone number that corresponds with the most recently updated incident. The system can then create an "incident" associated with the contact information. The system can then create an "incident" associated with the contact information. If multiple contacts do not exist (i.e., there is a single, previously-verified contact associated with the caller's telephone number), the system creates an "incident" associated with the contact information. If the customer's entered home or primary telephone number does not match up with any contact information in the database, the system can create a contact associated with the caller's entered home or primary telephone number. Thereafter, the system can create an incident associated with the newly-created contact information.

After an incident has been created, voice commands from the receiving system walk the caller through the process of obtaining information (data) from the originating device (e.g., an autonomous cleaning robot). For example, the caller places the phone near the originating device and performs the necessary steps to make the originating device "speak" information, including identification and other troubleshooting information, which is received and collected by the receiving system. Having received that data, the system verifies the data, for example using a cycle redundancy check (CRC). If the data cannot be verified (e.g., there was an error in its transmission), the system can ask the user to have the originating device speak the data again. The data is then decoded and rechecked. In certain embodiments, the system will try only a limited number of times to have the originating device speak verifiable information before routing the caller in another direction. In a case where a predetermined number of data failures occur, the system can post the reason for the failure to an appropriate field in a database and then transfer the caller to an agent or, of it is after hours (i.e., an agent is not available), the system can create an incident and read that incident back to the caller for their records.

If the data received from the originating device is verified, the system decodes the data and formulates a hexadecimal character string from the decoded data. The hexadecimal character string is submitted to a customer service server (e.g., provided by the device manufacturer or service representative) via, for example, an HTTP submit/post as would be understood by one skilled in the art. The customer service server should then return a response based on the information received. The response can be embodied in, for example, an XML-formatted document and include a predetermined number of knowledge-based answer IDs. If no response is received, a response failure reason can be posted to an appropriate field in a database/and or played to the caller, and, if needed or requested, the caller can be routed to an agent or, if it is after hours (i.e., an agent is not available), the system can create an incident and read that incident back to the caller for their records. An "incident," as used herein, can comprise a record including an identifying number and certain other information regarding the incident (e.g., originating device information, error codes and/or diagnosis information), wherein the identifying number can be used by the caller as a confirmation number.

If a response is received from the customer service servers the system determines whether there were multiple contacts in the initial call intake (for which the contact having a most recent incident was selected as corresponding to the caller). If there were multiple contacts, the system utilizes the originating device serial number obtained from the originating device with the data to determine whether that serial number corresponds with one of the multiple contacts. If so, that contact is used as the incident contact (it may be the previously-selected contact or another contact) and the response from the customer service database is written to incident fields or custom fields that can be associated with the contact information. If originating device serial number received with the data does not correspond to one of the multiple contacts, the response from the customer service database is written to incident fields or custom fields and the contact information can then be populated. Thereafter, the system plays diagnostic information for the caller and can route the caller to an agent if requested or necessary. If an agent is requested or necessary and it is after hours (i.e., an agent is not available), the system can create an incident and read that incident back to the caller for their records.

If a response is not received, the system can create an incident report or, if an agent is available (i.e., if it is not after hours) the system can transfer the caller to an agent. In accordance with various embodiments of the present teachings, the system informs the caller of an identifying number for the incident record created for the call, which can serve as a reference or confirmation number that the customer can utilize for follow-up information or assistance.

In various embodiments of the present teachings, the receiving system comprises a contact management or customer relationship management (CRM) interface that can be used for incident submission, along with a custom tab to display information, a Status Application Incident update component, a Status Application Incident lookup component, custom grammar to receive input from the originating device, and a custom code to verify input (received from the originating device) and decode information contained in input. In certain embodiments of the present teachings, the customer service database provider is responsible for interpretation of the data collected from the originating device.

The present teachings contemplate existing memory on the originating device being utilized to store the data used in accordance with the present teachings. An existing processor on the device can be used to convert the information via an encoding scheme to provide optimized recognition, an exemplary embodiment of which is described in more detail below. The originating device emits the encoded information as sounds transmittable via a telephone connection to a receiving system for processing. One skilled in the art will appreciate that an enhanced and/or dedicated processor can also be provided within the scope of the present teachings. The present teachings contemplate software modules including the desired functionality being loaded onto processors for assembly into new appliances/devices as well as loadable onto existing appliances/devices as, for example, and upgrade. The present teachings further contemplate the software modules being loadable onto processors of international appliances/devices if the appliance/device includes a masked ROM with a variety of languages on it. A masked ROM is a memory chip that is manufactured with its contents. In accordance with various embodiments, the software on the appliance/device gathers information of interest from the appliance/device memory into a message, encodes it, and speaks the encoded message.

Encoding data from an originating device for optimized transmission to a receiving system is hereinafter described in more detail. In accordance with various embodiments of the present teachings high recognition confidence words and numbers are identified for one or more voice applications and mapped to hexadecimal characters. For example, sixteen (16) words with the highest recognition confidence can be identified and utilized in a system of the present teachings, with each word having a unique mapping to a hexadecimal character. The present teachings can therefore include an empirical analysis of those words having the highest reliability of recognition over a particular phone-based voice recognition system.

The sixteen identified high recognition confidence words and numbers for the voice application(s) can be mapped to hexadecimal characters. In accordance with various embodiments, a memory of the originating device can store recorded, non-synthesized diagnostics and voice scripts for each of the sixteen identified high recognition confidence words and numbers. In certain embodiments, the recorded, non-synthesized diagnostics and voice scripts can be stored in separate, addressable files or memory locations. By direct memory addressing, particular "words" (e.g., stored in originating device memory as wav files) can be parsed from a wav file sentence file or location in memory for later retrieval by the originating device for emission, for example during a customer service call. An exemplary character map is produced below:

| Hexadecimal Character | wav File |
|---|---|
| 0 | One |
| 1 | Two |
| 2 | Three |
| 3 | Brushes |
| 4 | Five |
| 5 | Error |
| 6 | Seven |
| 7 | Eight |
| 8 | Nine |
| 9 | Hello |
| A | Robot |
| B | Wheel |
| C | On |
| D | Light |
| E | Remember |
| F | Area |

In the above map, 1, 2, 3, brushes, 5, error, 7, 8, 9, hello, robot, wheel, on, light, remember, and area represent the sixteen identified high recognition confidence words and numbers for the voice application(s). As can be seen, some number word wav files have high recognition (e.g., 1, 2, 3, 5, 7, 8, 9), but some do not have high recognition (e.g., 0, 4, 6). Along with the high recognition numbers, certain high recognition words can be used. In accordance with certain embodiments of the present teachings, further optimization can be achieved by mapping the highest recognition words to the hexadecimal characters having the highest frequency of use in customer service scenarios.

For example, a wav file encoding the following number: FEDCBA123456789 FEDCBA123456789 FEDCBA123456789 FEDCBA123456789 according to the following mapping:

| Wave File | Hexadecimal Character |
|---|---|
| Area | 0 |
| One | 1 |
| Two | 2 |
| three | 3 |
| brushes | 4 |
| five | 5 |
| error | 6 |
| seven | 7 |
| eight | 8 |
| nine | 9 |
| remember | A |
| light | B |
| on | C |
| wheel | D |
| robot | E |
| hello | F |

returns the following recognition: hello robot wheel on light remember area one two three brushes five error seven eight nine hello robot wheel on light remember area one two three brushes five error seven eight nine hello robot wheel on light remember area one two three brushes five error seven eight nine hello robot wheel on light remember area one two three brushes five error seven eight nine hello robot wheel on light remember area one two three brushes five error seven eight nine hello robot wheel on light remember area one two three brushes five error seven eight nine. The data within the originating device's memory is encoded (converted as set forth above) prior to being transmitted (spoken) by the originating device for communication to the receiving system. In accordance with certain embodiments, the data is converted immediately prior to transmission.

This wav file string can be transmitted by the originating device to a voice application of the receiving system via a communication line. The receiving system can then convert the file string back to its original form for storage and/or analysis.

The present teachings contemplate using recorded voice messages, synthesized voice messages, and/or a combination thereof. Consumer appliances and electronic devices can include a variety of scripts used, for example, for communicating with the consumer. Such scripts can, for example, assist the user in operating or servicing the appliance/device. As an example, a script can direct the consumer to charge the appliance/device's battery, empty its dust bin, or turn the appliance/device off after an extended period of non-use. These scripts define predetermined sentences or messages for user interface and, within the words that may be recorded or synthesized, and already available within the scripts for the appliance/device, the present teachings contemplate determining and utilizing a subset (e.g., sixteen) of those words that have the highest distinctiveness from one another for use in accordance with the present teachings. The words having the highest distinctiveness can provide optimized message encoding for the words already available in the appliance/device's memory.

Additionally or alternatively, the present teachings contemplate determining and utilizing a subset (e.g., sixteen) of the available scripted words that have the best recognition potential for a given voice recognition system. In certain embodiments of the present teachings, the words in the scripts are supplemented with predetermined optimized words used for conversion, or the optimized words used for conversion are simply loaded into memory without considering the words already available in the appliance/device's memory.

The optimized words are mapped to a code character set as set forth in the exemplary embodiment described above in accordance with the present teachings.

A suitable set of most recognizable words matched to a particular appliance/device's scripts can be determined empirically for most voice recognition systems that can be employed by a receiving system. Synthesized voice phoneme combinations also lend themselves to a similar empirical analysis of recognizability and can therefore be utilized in accordance with certain embodiments of the present teachings, although it should be noted that recognition by existing voice recognition systems is typically based on a particular regional accent and natural human speech, and is likely more successful with recorded voice.

In accordance with various embodiments of the present teachings, the sixteen words selected for encoding the data for recognition by the voice application(s) can be selected to provide optimal recognition over a variety of voice applications, such as all available voice applications or the most commonly-used voice applications, so that the originating device can accurately communicate with a variety of receiving systems, or so that the receiving system can change the type of voice application it utilizes without reprogramming the originating devices from which it receives data.

Customer Service can commonly cost about $8.00 per call, including about a $6.00 cost for talking time at $1.00 per minute, and $2.00 wrap-up to record information regarding the call into a customer service system. Most of a customer service call is typically spent gathering information such as the appliance/device serial number, a description of the problem perceived by the customer, explaining how to troubleshoot, and recording information such as an incident report that can include, for example, customer information, some or all of the data received from the originating device, and troubleshooting/diagnostic information.

The present teachings contemplate a system that can ideally collect necessary information and determine or take corrective action in about 30 seconds, and can utilize automated troubleshooting menus or decision trees or automatically send a replacement part request for the caller. In certain embodiments, replacement part requests are made only after caller contact/address confirmation.

By facilitating a more accurate transfer of information directly from the appliance/device to the receiving system (e.g., appliance/device identification information and error codes) the present teachings can provide a reduced, more accurate warranty exchange by ensuring that manufacturers or service providers send the correct part, for the correct appliance/device, for the correct reason. This can provide a warranty cost savings for a manufacturer or service provider. For example, more accurate information received directly from the originating device can allow the receiving system to differentiate between a bad battery, a device malfunction, or a dock/charger malfunction. This simplified and more accurate troubleshooting/repair can also reduce returns by helping customers resolve problems more simply and in a shorter time.

A system in accordance with the present teachings can additionally facilitate at least a limited 24-hour customer service and handle a larger volume of calls because most or many customer calls can be automated. In embodiments utilizing 24-hour customer service, customer service issues requiring human intervention can request the customer's contact information and schedule a return call, email, or other contact from a live representative.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A consumer appliance, comprising:

a memory;

a processor connected to the memory;

a speaker connected to the processor for playing audible sounds;

stored in the memory, a set of prerecorded human or synthesized voice messages including a plurality of individual words;

stored in the memory, a mapping of (a) a subset of the individual words having a ranked recognition accuracy higher than the remainder of the individual words to (b) a set of code characters; and an operation routine configured to execute in response to a first command so that the processor plays selected ones of the subset of individual words, the selected ones being selected, according to the mapping, to correspond to a diagnostic, customer service, or a code sequence made up of selected ones of the set of code characters.

2. The consumer appliance of claim 1, wherein the set of code characters comprises a set of hexadecimal characters.

3. The consumer appliance of claim 2, wherein the set of code characters comprises a full set of hexadecimal characters.

4. The consumer appliance of claim 1, further comprising a second operation routine configured to execute in response to a second command so that the processor plays selected prerecorded human voice messages over the speaker as audible sounds.

5. The consumer appliance of claim 4, wherein the messages are played as part of a demonstration, user interface, or instructional script.

6. A customer service server, comprising:

a processor;

a telephone interface connected to the processor;

a memory connected to the processor and comprising a mapping of (a) a subset of individual words of a prerecorded human or synthesized voice messages, at least some of which are received as audible sounds output by a consumer appliance via the telephone interface, to (b) a set of code characters;

a voice recognition software facility;

a routine executed by the processor for sending members of the subset of individual words received from the consumer appliance to the voice recognition software facility, wherein the recognized words returned from the voice recognition software facility are converted and decoded to a character sequence; and a routine executed by the processor for interpreting the character sequence and initiating and a customer service action based on the interpreted character sequence.

7. The customer service server of claim 6, wherein the customer service action comprises at least one of initiating sending of a replacement part and providing directions to a web page detailing servicing instructions.

8. The customer service server of claim 6, wherein the recognized words returned from the voice recognition software are converted to a set of code characters comprising a set of hexadecimal characters.

9. The consumer appliance of claim 8, wherein the set of code characters comprises a full set of hexadecimal characters.

10. A method for optimizing message transmission and decoding, the method comprising:

reading data from a memory of an originating device, the data comprising information regarding the originating device;

encoding the data by converting the data to a subset of words having a ranked recognition accuracy higher than the remainder of words;

transmitting the encoded data from the originating device to a receiving system audibly as words via a telephone connection;

utilizing a voice application to recognize the words;

decoding the words back to the data; and taking a predetermined action based on the data.

11. The method of claim 10, further comprising verifying the data after it has been transmitted from the originating device to the receiving system.

12. The method of claim 11, wherein verifying the data comprises performing a cycle redundancy check.

13. The method of claim 10, wherein taking a predetermined action comprises storing information regarding usage of the originating device.

14. The method of claim 10, wherein taking a predetermined action comprises accessing a database to retrieve contact information regarding a purchaser of the originating device from a list of contacts stored in the database.

15. The method of claim 10, wherein the data includes at least one error code.

16. The method of claim 15, wherein the at least one error code is used to determine an appropriate customer service action.

17. The method of claim 16, wherein the appropriate customer service action comprises one or more of transmitting troubleshooting information, connecting a consumer to an agent or representative, and requesting replacement parts.

18. The method of claim 16, further comprising utilizing a decision tree to determine the appropriate customer service action based on the error code.

* * * * *